United States Patent
Kim et al.

(10) Patent No.: US 10,067,610 B2
(45) Date of Patent: Sep. 4, 2018

(54) METHOD AND APPARATUS FOR RECOGNIZING TOUCH GESTURE

(71) Applicant: Samsung Electronics Co., Ltd., Suwon-si (KR)

(72) Inventors: Namjoon Kim, Anyang-si (KR); Joonah Park, Seoul (KR); Du-sik Park, Suwon-si (KR); Jungsoon Shin, Yongin-si (KR); Soochul Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/798,803

(22) Filed: Jul. 14, 2015

(65) Prior Publication Data

US 2016/0147376 A1    May 26, 2016

(30) Foreign Application Priority Data

Nov. 26, 2014 (KR) .................. 10-2014-0166824

(51) Int. Cl.

| | | |
|---|---|---|
| *G06F 3/042* | (2006.01) | |
| *G06F 3/01* | (2006.01) | |
| *G06F 3/041* | (2006.01) | |
| *G06F 1/16* | (2006.01) | |
| *G06F 3/0488* | (2013.01) | |

(52) U.S. Cl.
CPC ............ *G06F 3/0425* (2013.01); *G06F 1/163* (2013.01); *G06F 3/0418* (2013.01); *G06F 3/04883* (2013.01); *G06F 2203/04101* (2013.01)

(58) Field of Classification Search
CPC ...... G06F 3/0425; G06F 3/0416; G06F 3/017; G06F 2203/04108; G06F 1/163; G06F 3/04883; G06F 3/0418; G06F 2203/04101; G06F 3/042; G06F 3/01; G06F 3/041; G06F 3/044
See application file for complete search history.

(56) References Cited

U.S. PATENT DOCUMENTS

| | | |
|---|---|---|
| 8,228,315 B1 * | 7/2012 | Starner ............... G02B 27/017 345/175 |
| 8,558,759 B1 | 10/2013 | Prada Gomez et al. |
| 8,624,836 B1 | 1/2014 | Miller et al. |
| 2010/0125816 A1 | 5/2010 | Bezos |
| 2010/0199232 A1 | 8/2010 | Mistry et al. |
| 2011/0134074 A1 | 6/2011 | Norieda |
| 2012/0162139 A1 * | 6/2012 | Chen ..................... G06F 3/0421 345/175 |
| 2014/0055352 A1 | 2/2014 | Davis et al. |

(Continued)

FOREIGN PATENT DOCUMENTS

| | | |
|---|---|---|
| JP | 2012-123608 A | 6/2012 |
| JP | 2014-48691 A | 3/2014 |

(Continued)

*Primary Examiner* — Md Saiful A Siddiqui
(74) *Attorney, Agent, or Firm* — NSIP Law

(57) ABSTRACT

A method and an apparatus for recognizing a touch gesture are disclosed, in which the apparatus may obtain a depth image in which a touch object and a background area are captured, detect a touch input applied by the touch object to the background area in a touch detection area, and recognize a touch gesture associated with the touch input by tracking a change in the touch input.

20 Claims, 16 Drawing Sheets

(56) References Cited

U.S. PATENT DOCUMENTS

| | | | |
|---|---|---|---|
| 2014/0098018 A1 | 4/2014 | Kim et al. | |
| 2014/0208274 A1* | 7/2014 | Smyth | G06F 3/0304 715/863 |
| 2014/0368422 A1* | 12/2014 | Gupta | G06F 3/0304 345/156 |
| 2015/0009153 A1* | 1/2015 | Jin | G06F 3/041 345/173 |
| 2015/0323998 A1* | 11/2015 | Kudekar | G06F 1/163 345/156 |

FOREIGN PATENT DOCUMENTS

| | | |
|---|---|---|
| KR | 10-2009-0061179 A | 6/2009 |
| KR | 10-2010-005550 A | 5/2010 |
| KR | 10-2014-0064694 A | 5/2014 |

\* cited by examiner

FIG. 10
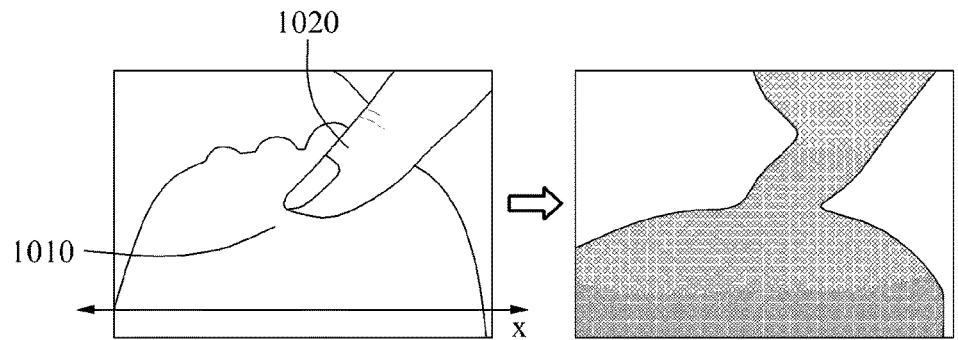
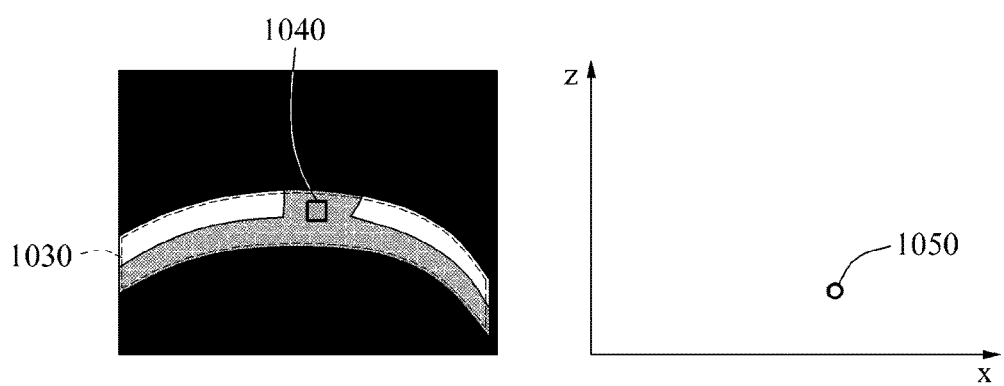
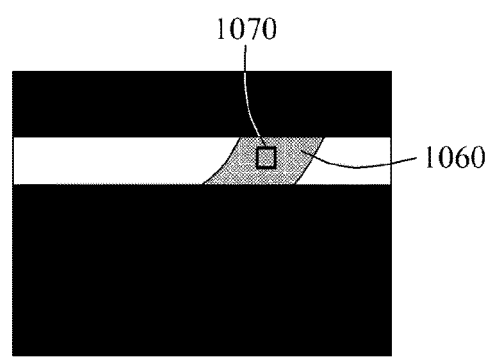

METHOD AND APPARATUS FOR RECOGNIZING TOUCH GESTURE

CROSS-REFERENCE TO RELATED APPLICATION(S)

This application claims the benefit under 35 USC 119(a) of Korean Patent Application No. 10-2014-0166824, filed on Nov. 26, 2014, in the Korean Intellectual Property Office, the entire disclosure of which is incorporated herein by reference for all purposes.

BACKGROUND

1. Field

The following description relates to technology for recognizing a touch gesture.

2. Description of Related Art

Recently, various user interfaces are being developed to provide a user with a convenient control environment. Among these interfaces, a touchless control type may control a terminal without a contact with or a touch on a touch screen or a button of the terminal. Such a touchless control type may apply, for example, a method using sensing information transmitted from various proximity sensors, a method using a temperature of a body portion of a user, and a method using an image in which a finger is captured.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of recognizing a touch gesture, the method including obtaining a depth image in which a touch object and a background area are captured, detecting, from the depth image, a touch input applied by the touch object to the background area in a touch detection area, and recognizing a touch gesture associated with the touch input by tracking a change in the touch input.

The method may further include learning the background area, and determining the touch detection area from the learned background area. The detecting of the touch input may be performed in the touch detection area based on the learned background area.

The detecting of the touch input may include determining a touch detection area to detect the touch input based on the learned background area, and detecting the touch input within the touch detection area.

The touch detection area may include a portion of the learned background area and an adjacent area of a boundary of the learned background area.

The learning of the background area may include determining whether an initial background area on an initial depth image satisfies a predetermined learning condition and learning the background area based on the initial depth image when the background satisfies the predetermined learning condition.

The method may include: determining whether a predetermined learning cycle arrives; obtaining a learning depth image when the predetermined learning cycle arrives; determining, when the predetermined learning cycle arrives, whether a touch event is present in a touch detection area of the learning depth image based on learning a background area for learning included in the learning depth image; extracting a an adjacent area that is adjacent to a boundary of the background area for learning from the learning depth image when the touch event is absent in the touch detection area, and learning a new touch detection area based on the extracted adjacent area.

The detecting of the touch input may include determining whether the touch object makes contact on the touch detection area, and detecting a change in the touch input when the touch object is in contact on the touch detection area.

The determining of whether the touch object makes contact on the touch detection area may include determining whether the touch object makes contact with a boundary of the learned background area on the touch detection area based on a shape of the learned background area.

The detecting of the touch input may include determining at least one of a location of the touch input and a touch angle of the touch input. The tracking of the change in the touch input may include tracking at least one of a change in the location of the touch input and a change in the touch angle of the touch input.

The detecting of the touch input may include detecting touch inputs within the touch detection area. The recognizing of the touch gesture may include recognizing a touch gesture associated with the touch inputs based on a mutual relation between the detected touch inputs.

According to another general aspect, a computer-readable storage medium may comprise a program comprising instructions to cause a computer to perform the method of recognizing a touch gesture.

In another general aspect, there is provided a method of recognizing a touch gesture, the method including learning, based on a depth image, a background area to be in contact with a touch object, determining a touch detection area based on the learned background area, detecting a touch input by the touch object based on a touch object area in the touch detection area, and recognizing a touch gesture corresponding to a motion of the touch input.

The learning of the background area may include determining whether a predetermined learning cycle arrives, determining, when the predetermined learning cycle arrives, whether a touch event is present in the depth image, extracting a background area for learning from a learning depth image when the touch event is absent in the depth image, and learning the background area to be in contact with the touch object based on the extracted background area.

The detecting of the touch input may include determining whether the touch object makes contact within the touch detection area, and detecting a change in the touch input when the touch object is in contact with the touch detection area.

The detecting of the touch input may include determining at least one of a location of the touch input and a touch angle of the touch input. The recognizing of the touch gesture may include recognizing a touch gesture associated with the touch input by tracking at least one of a change in the location of the touch input and a change in the touch angle of the touch input.

In still another general aspect, there is provided an apparatus for recognizing a touch gesture, the apparatus including a depth sensor configured to obtain a depth image in which a touch object is captured, and a processor configured to detect, from the depth image, a touch input applied by the touch object in a touch detection area and recognize a touch gesture associated with the touch input by tracking a change in the touch input.

The apparatus may further include a learner configured to learn a background area for an adjacent area of that is adjacent to a boundary of a background area detected in the depth image. The processor may be configured to update the touch detection area based on updating the learned background area at predetermined learning cycles.

The learner may determine whether a touch event is present on the touch detection area when a predetermined learning cycle arrives, and to extract a learning background area from a learning depth image and learn the background area from the learning depth image when the touch event is absent in the touch detection area.

In a further general aspect, there is provided an apparatus for recognizing a touch gesture, the apparatus including a depth sensor configured to obtain a depth image, a learner configured to learn a background area with which a touch object makes contact from the depth image obtained by the depth sensor, and a processor configured to detect a touch input applied by the touch object from the depth image in which the touch object is captured and recognize a touch gesture corresponding to a motion of the touch input.

The processor may be configured to determine a touch detection area for detecting the touch input. The touch detection area may include a portion of the learned background area and an area adjacent to a boundary of the learned background area.

The touch detection area may be only a portion of an entire area of the depth image.

The processor may be configured to update the touch detection area based on updating the learned background area at predetermined learning cycles.

Other features and aspects will be apparent from the following detailed description, the drawings, and the claims.

BRIEF DESCRIPTION OF THE DRAWINGS

FIG. 10 is a diagram illustrating an example operation of analyzing a touch input.

Figure 1A:
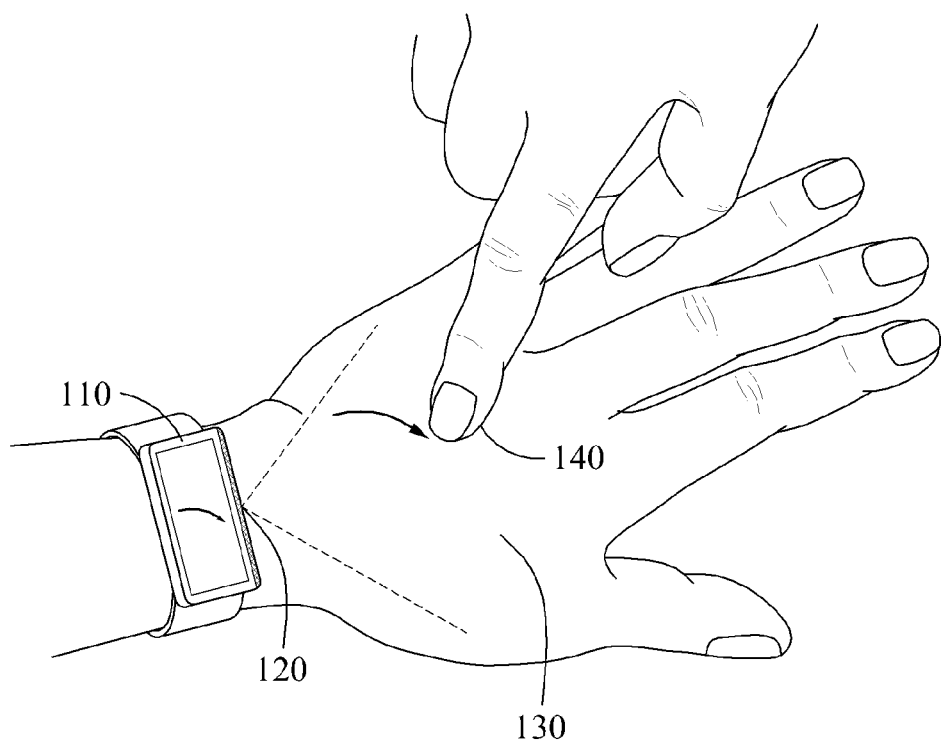
FIGS. 1A through 1C illustrate examples of implementation of an apparatus for recognizing a touch gesture.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1B:
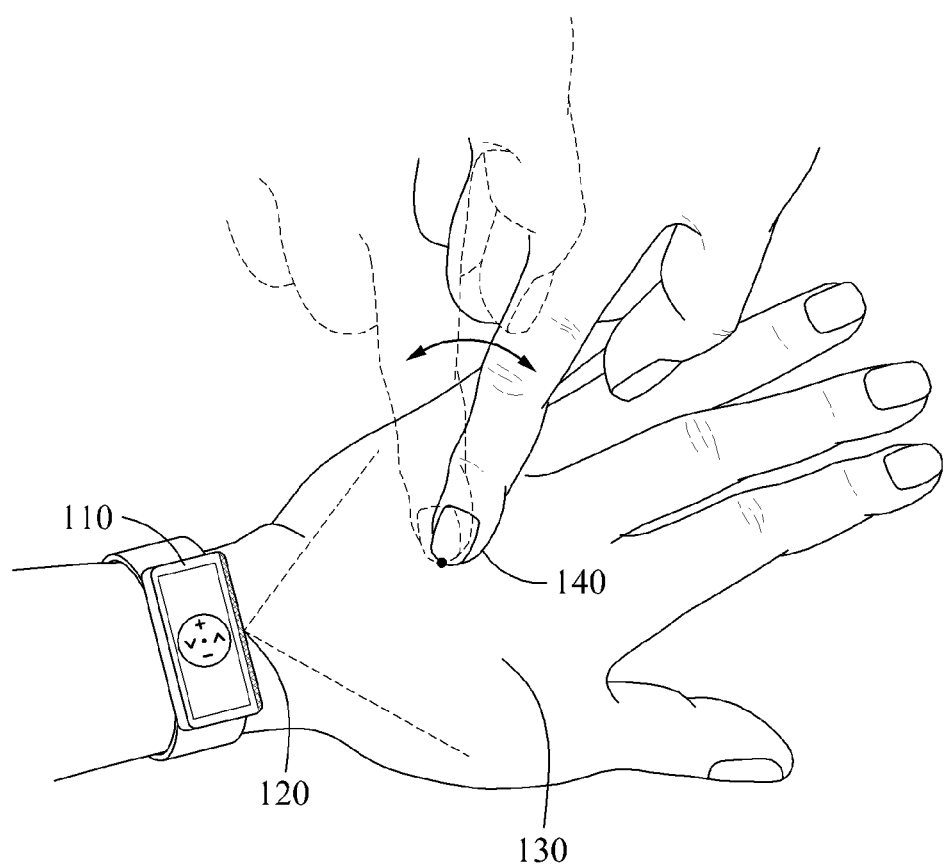
Figure 1C:
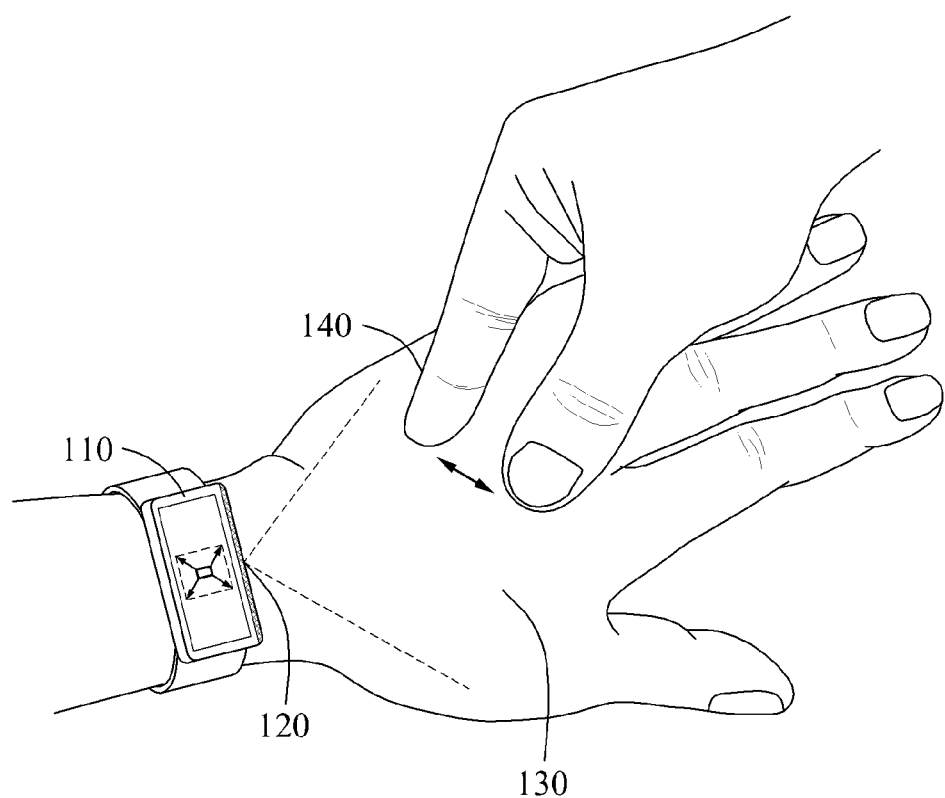

FIGS. 1A through 1C illustrate examples of implementation of an apparatus for recognizing a touch gesture.

Referring to FIGS. 1A through 1C, the apparatus for recognizing a touch gesture, hereinafter also referred to as a touch gesture recognizing apparatus, recognizes a touch gesture made by a motion of a touch object. For example, a user may input a user input to a dorsum or a palm of a hand or an arm area of the user using the touch object. The touch object may be, for example, a finger, a pen or a stylus. The touch gesture recognizing apparatus recognizes the user input using a depth sensor and recognizes a gesture pattern intended by the user. For example, the user may input the user input, for example, an oriented or circular symbol and a character, to the dorsum of the hand.

The touch gesture recognizing apparatus obtains depth information on the touch object using a depth sensor and recognize the touch gesture based on the obtained depth information. The depth sensor may be, for example, a camera. The depth information on the touch object may include information on a distance between the touch object and the touch gesture recognizing apparatus including the depth sensor.

The touch gesture recognizing apparatus generates, based on a depth threshold value, a depth image in which an area deviating from an angle of view of the depth sensor is obscured. In the depth image, an area present in a distance exceeding the depth threshold value may be set as a depth value. For example, in the depth image, pixels in the area present in the distance exceeding the depth threshold value may be set as "0" or "maximum" depth value, for example, 255, based on a type of the depth sensor. When a background area is the dorsum of the hand of the user, a remaining area from which the dorsum is excluded in the depth image may be set as 0 or the maximum depth value.

The touch gesture recognizing apparatus may obtain a stream of the depth image in which the touch object is captured, and recognize the user input by tracking the motion of the touch input made by the touch object based on the stream of the depth image. The touch gesture recognizing apparatus may identify the touch input made by the touch object based on the depth information on the touch object that may be changed over time, and recognize the touch gesture intended by the user by analyzing the identified touch input.

The touch gesture recognizing apparatus may perform gesture recognition that is robust against a movement of the dorsum by continuously learning a background area included in the depth image. The background area may include, for example, the dorsum or the palm of the hand, and the arm area. The touch gesture recognizing apparatus may determine whether a single object or multiple touch objects appearing in the depth image make contact with the background area, and perform the tracking by converting locations of the touch objects in contact with the background area to two-dimensional (2D) data. The touch gesture recognizing apparatus may recognize the gesture pattern intended through the user input by the user based on a result of the tracking, and generate a control signal corresponding to the recognized gesture pattern.

The touch gesture recognizing apparatus may be included in various wearable devices to operate. For example, as illustrated in the examples of FIGS. 1A through 1C, a touch gesture recognizing apparatus 110 may be included in a wearable device, such as a smart watch, worn around a wrist to operate. The touch gesture recognizing apparatus 110 may obtain a depth image in which a touch object 140 is captured using a depth sensor 120, and recognize a gesture pattern made by a motion of the touch object 140 on a dorsum 130 of a hand by analyzing a change in the depth image over time. In the examples of FIGS. 1A through 1C, broken lines commencing from the depth sensor 120 may form an angle of view, which indicates a sensible range that may be sensed by the depth sensor 120.

The touch gesture recognizing apparatus 110 tracks the motion of the touch object 140 by analyzing the change in the depth image over time, and recognizes the gesture pattern corresponding to the motion of the touch object 140. For example, the touch object 140 may refer to a finger of the user or an object in a form of a pen or a stylus. The touch gesture recognizing apparatus 110 generates information on the recognized gesture pattern, and the wearable device performs an interface operation corresponding to the recognized gesture pattern.

For example, referring to FIG. 1A, the touch gesture recognizing apparatus 110 tracks the motion of the touch object 140 on the dorsum 130 based on the depth image obtained by the depth sensor 120, and the tracked motion of the touch object 140 is displayed through the wearable device.

Referring to FIG. 1B, the touch gesture recognizing apparatus 110 tracks a change in a touch angle in a state in which the touch object 140 is in contact with the dorsum 130 based on the depth image obtained by the depth sensor 120, and the wearable device may perform a control operation corresponding to the tracked change in the touch angle of the touch object 140. In the example of FIG. 1B, the user may experience an effect that may be experienced through a joystick interface by adjusting the touch angle of the touch object 140.

Referring to FIG. 1C, the touch gesture recognizing apparatus 110 may track motions of multiple touch objects 140 based on a depth image obtained by the depth sensor 120, and the wearable device may perform a control operation corresponding to the motions of the touch objects 140. When the user makes a spreading gesture by increasing a distance between two fingers, which are the touch objects 140, while the two fingers are in contact with the dorsum 130, a control operation through which contents displayed on the wearable device are enlarged may be performed.

Figure 2:
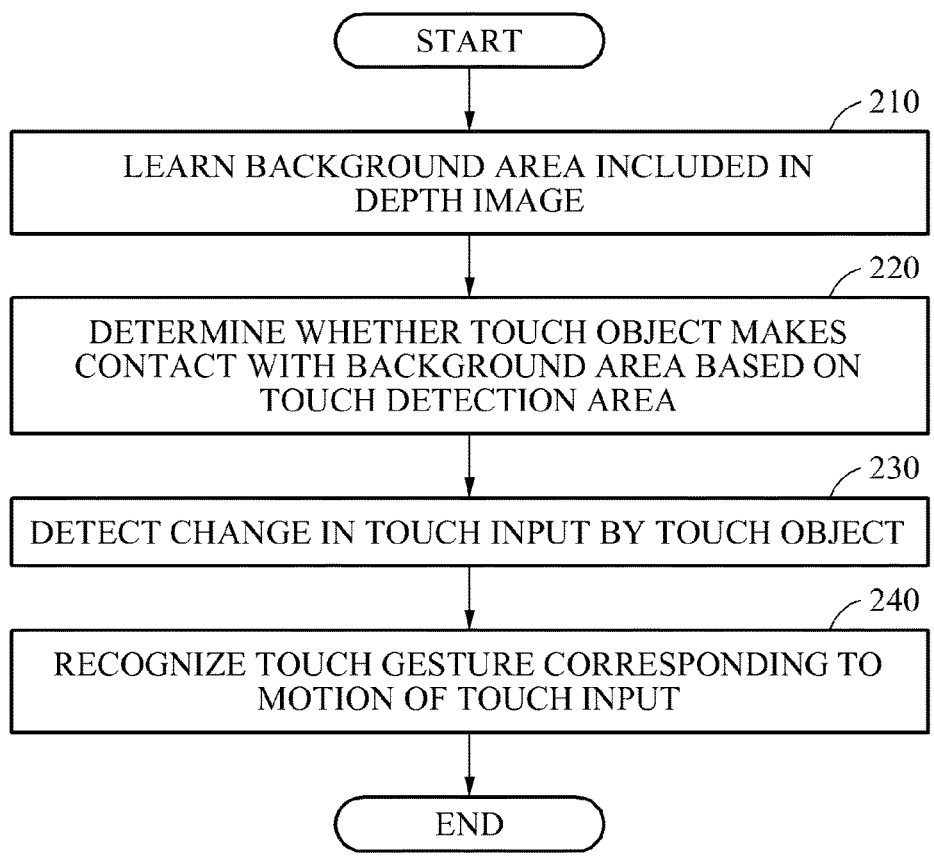
FIG. 2 is a flowchart illustrating an example method of recognizing a touch gesture.

FIG. 2 is a flowchart illustrating an example method of recognizing a touch gesture. The method of recognizing a touch gesture may be performed by a touch gesture recognizing apparatus.

Referring to FIG. 2, in operation 210, the touch gesture recognizing apparatus learns a background area included in a depth image. The background area refers to an area to be in contact with a touch object. The touch gesture recognizing apparatus may learn a background area corresponding to a dorsum or a palm of a hand or an arm area of a user to which a touch input is input by the touch object. The touch gesture recognizing apparatus may learn a depth image of a background area in an absence of the touch object in order to distinguish between the background area in the depth image and a touch object area in which the touch object appears in the depth image.

The touch gesture recognizing apparatus may determine a background area to be used for the touch input by learning a background area included in an initial depth image obtained at an initial state of an operation. The touch gesture recognizing apparatus may extract the background area from the initial depth image, and learn a background area to be in contact with the touch object based on the extracted background area. A detailed operation of learning the background area by the touch gesture recognizing apparatus at the initial state will be described later with reference to FIGS. 3 and 4.

Subsequent to the initial state, the touch gesture recognizing apparatus may continuously learn a background area included in the depth image. For example, every time a predetermined learning cycle arrives, the touch gesture recognizing apparatus may learn a background area from a learning depth image, and update the background area to be in contact with the touch object based on a result of the learning. The touch gesture recognizing apparatus may determine whether a touch event is present in the touch detection area based on learning a background area. When the touch event is absent from the learning depth image, the touch gesture recognizing apparatus may extract the background area from the learning depth image, and learn the background area to be in contact on the touch object based on the extracted background area. The touch event may refer to an event indicating that the touch object makes contact with the background area. A detailed operation of continuously learning the background area by the touch gesture recognizing apparatus subsequent to the initial state will be described later with reference to FIGS. 5 and 6.

The touch gesture recognizing apparatus may determine a touch detection area based on the learned background area. The touch detection area may include a portion of the learned background area and an adjacent area that is adjacent to a boundary of the learned background area. For example, when the background area is the dorsum of the hand of the user, the touch detection area may include a portion of the dorsum and an adjacent area that is adjacent to a boundary of the dorsum.

Searching for a touch input made by the touch object from all areas included in the depth image and recognizing the found touch input may be ineffective. The touch gesture recognizing apparatus may determine a portion of the depth image to be the touch detection area for detecting the touch input and thus, effectively detect the touch input from the depth image. The touch gesture recognizing apparatus may reduce an amount of computation by verifying whether the touch input is present based on the touch detection area, which is a portion of an entire area of the depth image.

In operation 220, the touch gesture recognizing apparatus determines whether the touch object makes contact with the background area based on the depth image in which the touch object is captured based on the touch detection area. The depth image may include information on a depth from the touch gesture recognizing apparatus to the touch object. The touch gesture recognizing apparatus may determine whether the touch object makes contact with the background area within the touch detection area. For example, the touch gesture recognizing apparatus may determine whether the touch object makes contact with the background area based on a blob-shaped touch input area included in the touch detection area.

In operation 230, the touch gesture recognizing apparatus detects a change in the touch input made by the touch object. The touch gesture recognizing apparatus detects a motion of the touch input made by the touch object based on a touch object area included in the touch detection area. The touch gesture recognizing apparatus may determine a location of the touch input or a touch angle of the touch input.

The touch gesture recognizing apparatus may calculate an x coordinate value on spatial coordinates of the touch object area in a state in which the touch object is in contact with the background area. For example, the touch gesture recognizing apparatus may determine a point at a center of an area within edges of the touch object area to be the x coordinate value of the touch input based on a width direction of the depth image. The touch gesture recognizing apparatus may set, within the touch object area, an identification area corresponding to an edge of the touch object, and determine a depth value of the set identification area to be a z coordinate value on the spatial coordinates of the touch input. The touch gesture recognizing apparatus may convert the location of the touch input to 2D coordinate data of an x axis and a z axis based on the x coordinate value and the z coordinate value of the touch input. The touch gesture recognizing apparatus may determine the touch angle of the touch input by additionally calculating tilts in an x axis direction and a z axis direction.

A detailed operation of detecting the touch input from the depth image and detecting the change in the touch input by the touch gesture recognizing apparatus will be described later with reference to FIGS. 7 through 10.

In operation 240, the touch gesture recognizing apparatus recognizes a touch gesture corresponding to the motion of the touch input. The touch gesture recognizing apparatus identifies at least one touch object in contact with the background area, and analyze the motion of the touch input made by the touch object by tracking a moving route of the identified touch object. The touch gesture recognizing apparatus determines a gesture pattern intended by the user by analyzing a change in the 2D coordinate data of the touch input.

For example, the touch gesture recognizing apparatus may recognize the touch gesture associated with the touch input by tracking a change in the location of the touch input or a change in the touch angle of the touch input. The touch gesture recognizing apparatus may determine the gesture pattern intended by the user through the touch object by parsing the change in the location of the touch input or the change in the touch angle of the touch input, which are indicated in the depth image over time. The touch gesture recognizing apparatus may then generate information on the determined gesture pattern. The touch gesture recognizing apparatus may determine a motion pattern intended by the user using a learning based method or an existing gesture recognizing method. The information on the determined gesture pattern may be transmitted to another device, and the device may perform an interface operation corresponding to the gesture pattern.

For example, characters or gesture icons corresponding to the motion of the touch input may be displayed through another device. When the motion pattern corresponding to the motion of the touch input is a character, the device may display the character using an optical character recognition (OCR) method and a spelling corrector. When the motion pattern corresponding to the motion of the touch input indicates a gesture icon, the device may display the gesture icon on a screen. When a plurality of touch inputs is detected, the touch gesture recognizing apparatus may determine an interface operation based on a mutual relation between motions of the touch inputs.

Figure 3:
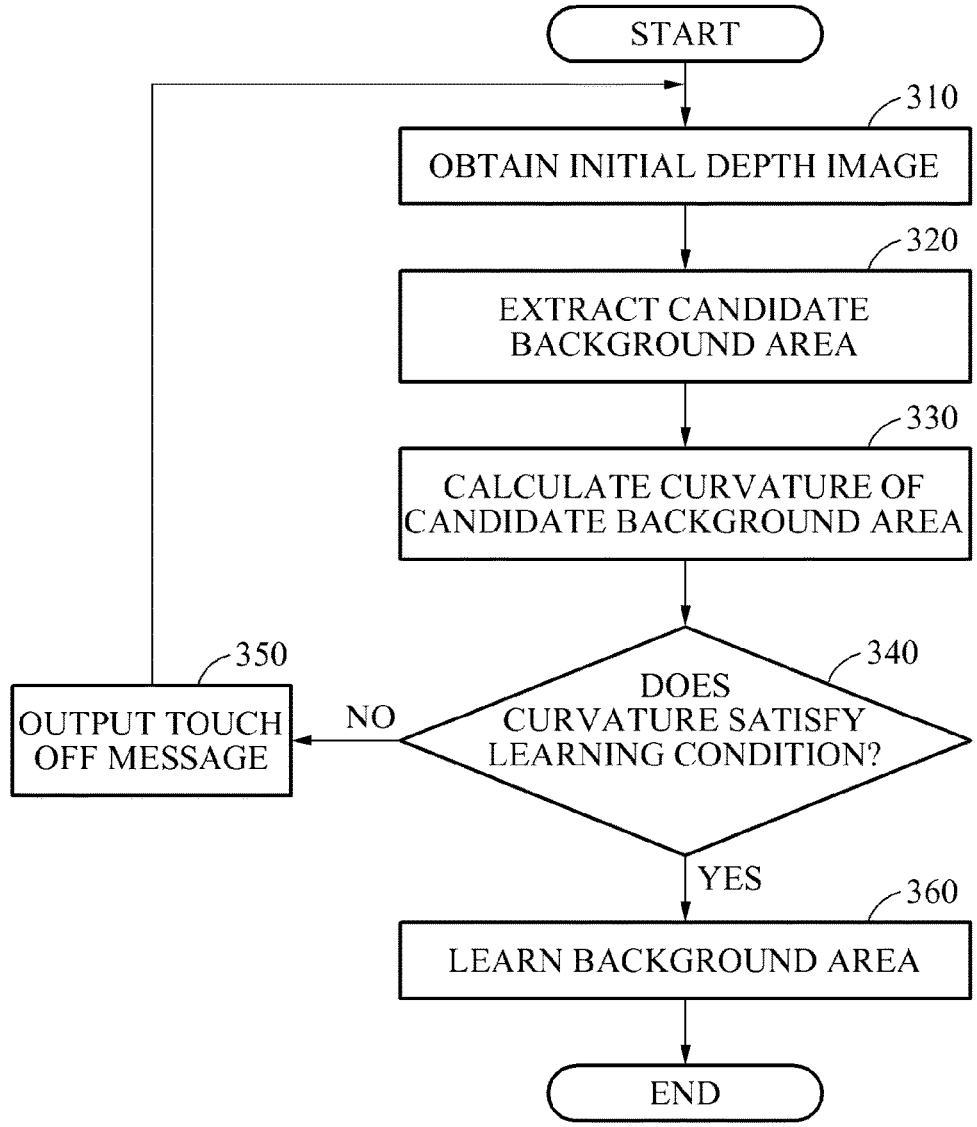
FIG. 3 is a flowchart illustrating an example method of learning a background area.

FIG. 3 is a flowchart illustrating an example method of learning a background area. According to the method of FIG. 3, a touch gesture recognizing apparatus may learn a background area from a depth image to distinguish between the background area corresponding to a contact surface and a touch object area of a touch object.

Referring to FIG. 3, in operation 310, the touch gesture recognizing apparatus obtains an initial depth image using a depth sensor in an initial state of an operation.

In operation 320, the touch gesture recognizing apparatus extracts a candidate background area from the initial depth image. For example, the touch gesture recognizing apparatus may extract a candidate background area corresponding to a dorsum of a hand of a user from the initial depth image using an existing connected component image processing method. In the connected component method, the initial depth image may be scanned and the pixels of the initial depth image may be grouped into components based on pixel connectivity such that all pixels in a connected component share similar pixel intensity values and are in some way connected with each other. Once all of the pixels have been grouped, each pixel may be labeled with a gray level or a color according to the component to which it was assigned. The touch gesture recognizing apparatus may extract the candidate background area in which noise and other objects are eliminated from the depth image through the connected component method.

In operation 330, the touch gesture recognizing apparatus calculates a curvature of the candidate background area. For example, the touch gesture recognizing apparatus may calculate a boundary curvature of the candidate background area.

In operation 340, the touch gesture recognizing apparatus determines whether the curvature of the candidate background area satisfies a predetermined learning condition. The touch gesture recognizing apparatus may determine whether the candidate background area includes an area indicating the touch object or another object based on the curvature of the candidate background area. For example, when the candidate background area includes the area indicating the touch object or another object instead of including only the dorsum of the hand, a section may exist in which a curvature value of the candidate background area is suddenly and significantly changed. When such a section exists, the touch gesture recognizing apparatus may determine that the candidate background area does not include only the dorsum of the hand and the curvature of the candidate background area does not satisfy the predetermined learning condition.

In operation 350, when the curvature of the candidate background area does not satisfy the predetermined learning condition, the touch gesture recognizing apparatus outputs a "touch off" message. The touch off message may refer to a message requiring the user to touch off, or move the touch object out of contact with, the background area. Subsequent to the output of the touch off message, the touch gesture recognizing apparatus may obtain an initial image again to learn a background area.

Also, when an area estimated not to be a background area in an upper portion of the initial depth image or an area longitudinally traversing the initial depth image exists, the touch gesture recognizing apparatus may determine that the candidate background area does not include only a background area, and may learn a background area by obtaining an initial depth image again.

In operation 360, when the curvature of the candidate background area satisfies the predetermined learning condition, the touch gesture recognizing apparatus learns the background area based on the candidate background area extracted from the initial depth image. The touch gesture recognizing apparatus may perform the learning to recognize the candidate background area extracted from the initial depth image to be a background area for detecting a touch input.

Figure 4:
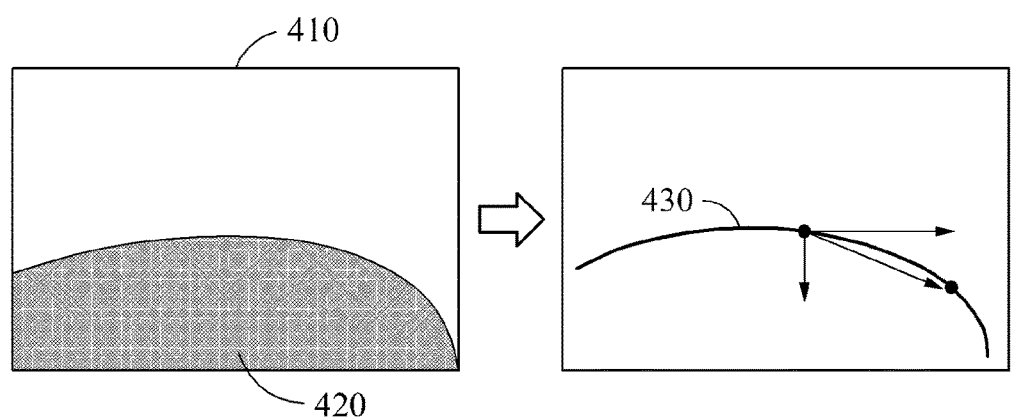
FIG. 4 is a diagram illustrating an example operation of learning a background area.

FIG. 4 is a diagram illustrating an example operation of learning a background area.

Referring to FIG. 4, a depth image 410 indicates an initial depth image obtained by a depth sensor disposed on a side of a watch type wearable device embedded with a touch gesture recognizing apparatus. The depth image 410 may be obtained when the depth sensor faces a dorsum side of a hand of a user. A dorsum area of the hand of the user is included as a background area 420 in the depth image 410. The background area 420 may correspond to an area to be in contact with a touch object.

The touch gesture recognizing apparatus may obtain, using the depth sensor, the initial depth image based on a depth threshold value. An area having a depth value exceeding the depth threshold value in the initial depth image may be set at a predetermined depth value. A remaining area from which the background area 420 is excluded in the depth image 410 may have a predetermined depth value based on the depth threshold value.

The touch gesture recognizing apparatus may extract, as a candidate background area, the background area 420 detected from the depth image 410, and calculate a curvature of a boundary 430 of the background area 420. For example, when a section in which the curvature of the boundary 430 of the background area 420 is suddenly and significantly changed exists or an area longitudinally traversing the depth image 410 exists, the touch gesture recognizing apparatus may determine that the background area 420 is not a complete background area. When the curvature of the boundary 430 of the background area 420 satisfies a predetermined learning condition, the touch gesture recognizing apparatus may learn a background area for detecting a touch input based on the background area 420 extracted from the depth image 410.

Figure 5:
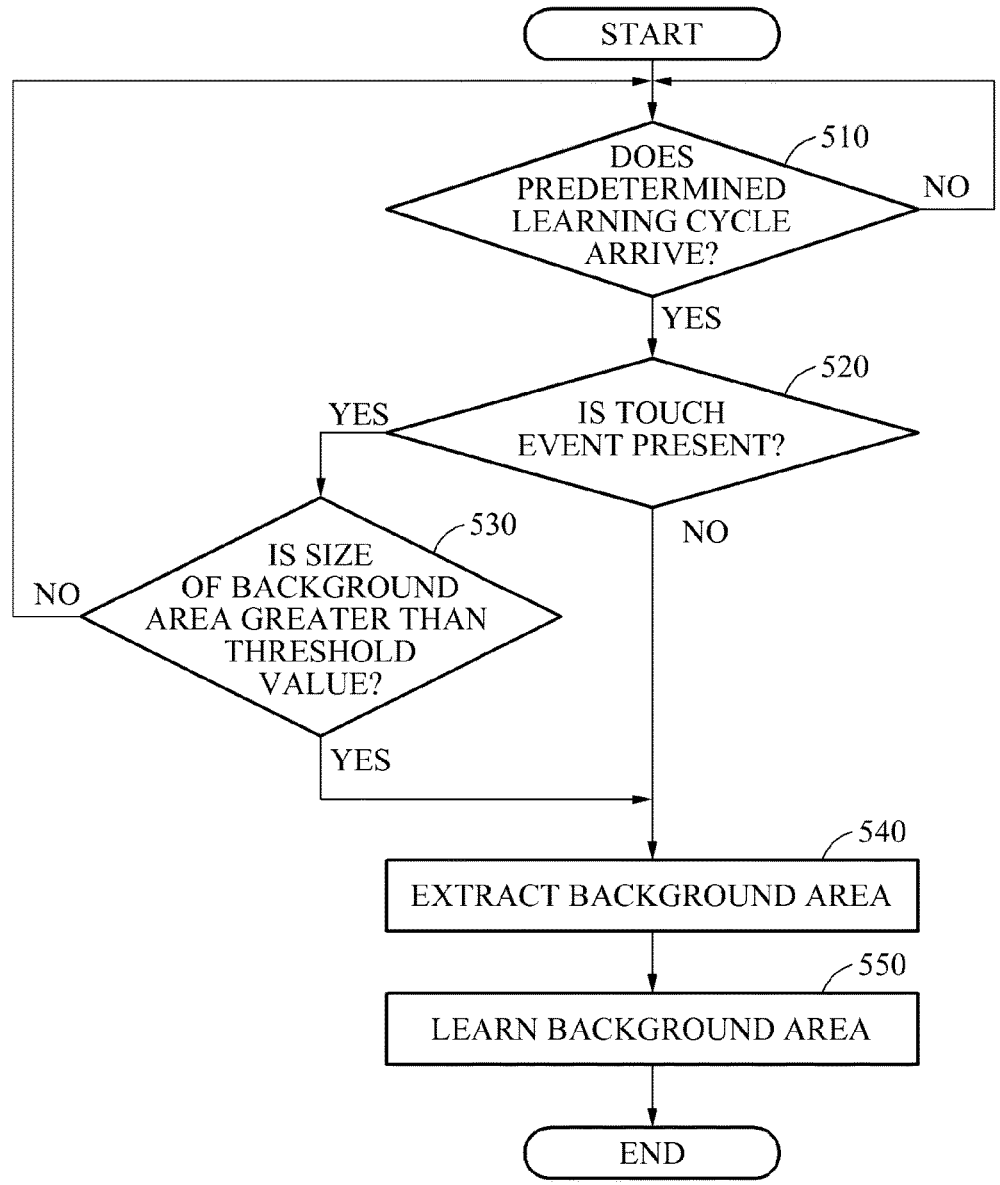
FIG. 5 is a flowchart illustrating another example method of learning a background area.

FIG. 5 is a flowchart illustrating another example method of learning a background area. A dorsum surface of a hand of a user, which corresponds to a background area facing a depth sensor of a watch type wearable device, may be changed based on a movement of a wrist of the user and thus, the background area facing the depth sensor may need to be learned on a periodic basis. Subsequent to learning of a background area at an initial state, a touch gesture recognizing apparatus may update information on the learned background area by periodically learning a background area to be in contact with a touch object.

Referring to FIG. 5, in operation 510, the touch gesture recognizing apparatus determines whether a predetermined learning cycle arrives. When the learning cycle is extremely short, a great system load may arise and thus, the learning cycle may be determined based on an influence on a system load by an operation of learning a background area.

In operation 520, when the learning cycle is determined to arrive, the touch gesture recognizing apparatus obtains a learning depth image used for learning a background area, and determines whether a touch event is present in the learning depth image. The touch gesture recognizing apparatus may determine whether the touch event, which indicates that the touch object is contacting a touch detection area, is present in the learning depth image to determine whether a complete background area exists.

When the touch event is present in the learning depth image in operation 520, operation 530 is performed. In operation 530, the touch gesture recognizing apparatus determines whether a size of the background area included in the touch detection area satisfies a predetermined learning condition. The size of the background area included in the touch detection area may be changed due to a large movement of the user. For example, when the size of the background area included in the touch detection area is greater than a predetermined threshold value, the touch gesture recognizing apparatus may proceed to operation 540 to learn the background area for an adjacent area that is adjacent to a boundary of the background area based on the learning depth image. Conversely, when the size of the background area included in the touch detection area is less than or equal to the predetermined threshold value, the touch gesture recognizing apparatus may return to operation 510 to perform operations 510 and 520 as described in the foregoing description.

In operation 540, when the touch event is determined to be absent from the learning depth image in operation 520 or the size of the background area is determined to satisfy the predetermined learning condition in operation 530 (e.g., the size of the background area included in the touch detection area is greater than a predetermined threshold value), the touch gesture recognizing apparatus extracts a background area from the learning depth image. For example, the touch gesture recognizing apparatus may extract the background area from the learning depth image using an existing connected component method.

In operation 550, the touch gesture recognizing apparatus learns the background area extracted from the learning depth image. The touch gesture recognizing apparatus may learn the background area extracted from the learning depth image, and update information on a predetermined background area based on a result of the learning.

Figure 6:
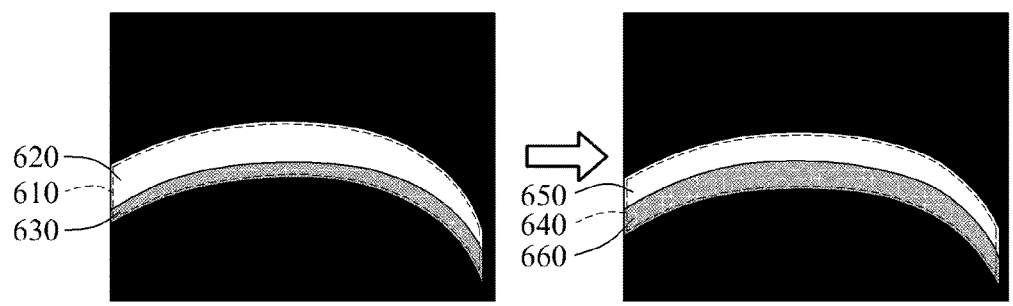
FIG. 6 is a diagram illustrating another example operation of learning a background area.

FIG. 6 is a diagram illustrating another example operation of learning a background area.

Referring to FIG. 6, a left box indicates a depth image including a background area changed by a movement of a user. A touch detection area 610 of the depth image includes a portion 630 of the changed background area and an adjacent area 620 that is adjacent to the portion 630. The adjacent area 620 may indicate an area adjacent to the portion 630 in an area having a depth value greater than a depth threshold value. The portion 630 of the background area may correspond to a portion of a dorsum area of a hand of the user. When the user moves a dorsum of the hand, a shape of the portion a 630 of the background area included in the predetermined touch detection area 610 may be changed.

The touch gesture recognizing apparatus may update the background area by learning a background area on a periodic basis to reduce an error that may be caused by a change in the background area. Referring to FIG. 6, the right box indicates a result of learning and updating the background area. A range of a touch detection area 640 may differ from a range of the touch detection area 610 because the result of updating the background area is considered in the touch detection area 640. Subsequent to the learning and updating of the background area, the touch detection area 640 may include a portion 660 of the updated background area and an adjacent area 650 that is adjacent to the portion 660. The touch gesture recognizing apparatus may recognize a touch gesture based on the updated touch detection area 640 until a next learning cycle arrives.

Figure 7:
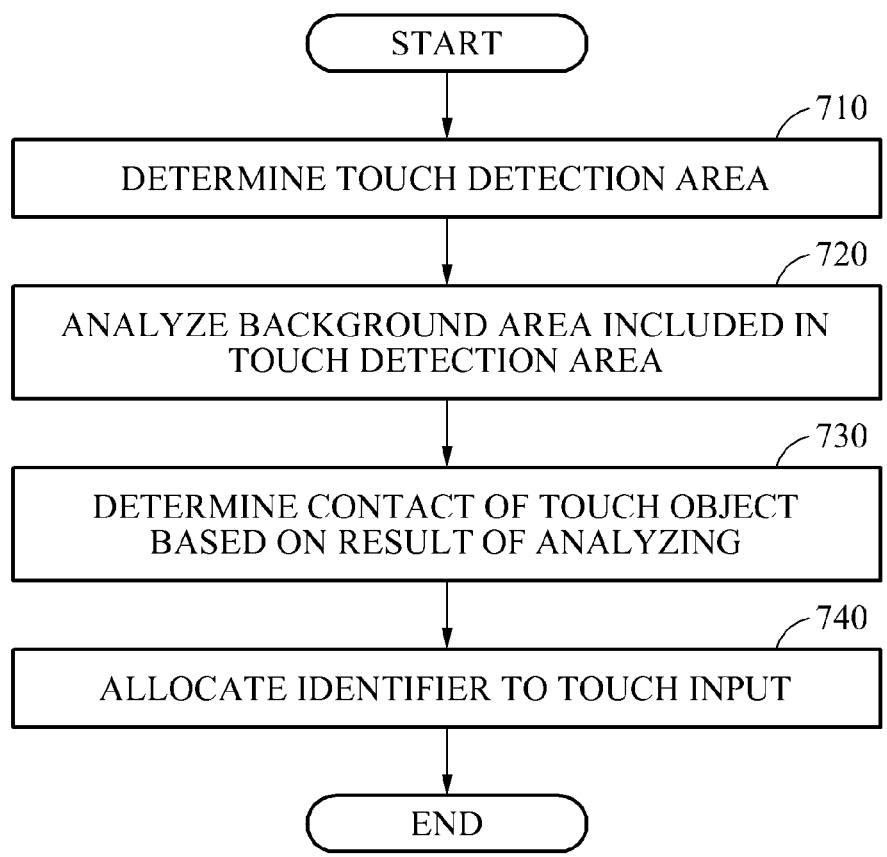
FIG. 7 is a flowchart illustrating an example method of detecting a touch input from a depth image.

FIG. 7 is a flowchart illustrating an example method of detecting a touch input from a depth image. A touch gesture recognizing apparatus may determine whether a touch input by a touch object exists based on a touch detection area including a portion of a background area included in a depth image. For example, the touch gesture recognizing apparatus may determine whether the touch object such as a finger makes contact with a dorsum of a hand of a user based on the touch detection area. The touch gesture recognizing apparatus may determine a movement of the finger of the user performed during the finger being in contact with the dorsum to be an intended motion of the user.

Referring to FIG. 7, in operation 710, the touch gesture recognizing apparatus determines a touch detection area. The touch gesture recognizing apparatus may determine the touch detection area based on a boundary of a learned background area. The touch gesture recognizing apparatus may determine the touch detection area including a portion of the learned background area and an adjacent area that is adjacent to the portion based on the boundary of the learned background area.

In operation 720, the touch gesture recognizing apparatus analyzes a background area included in the touch detection area. The touch gesture recognizing apparatus may determine a number of autonomous adjacent areas detected in the touch detection area by performing a connected component image processing method on an adjacent area which is not a background area in the determined touch detection area.

A touch input area formed by a touch object in the touch detection area may be a complementary area to an adjacent area and thus, the touch gesture recognizing apparatus may determine information on the touch input area using information on an autonomous adjacent area. The information on the autonomous adjacent area may include, for example, information on a size or coordinates of a bounding box including the autonomous adjacent area, and information on the number of the autonomous adjacent areas. The information on the touch input area may include, for example, information on a size or coordinates of a bounding box including the touch input area, and information on the number of touch input areas.

The information on the touch input area may be determined using the information on the autonomous adjacent area because reliability of depth information of the touch input area may be low due to a motion blur and noise produced by a moving touch object. When the reliability of the depth information of the touch input area is high, the touch gesture recognizing apparatus may not determine the information on the touch input area using the information on the autonomous adjacent area, but may instead obtain the information on the touch input area by directly performing the connected component image processing method on the touch input area.

In operation 730, the touch gesture recognizing apparatus determines whether there is a contact of the touch object with a touch detection area based on a result of the analyzing performed in operation 720. The touch gesture recognizing apparatus may determine the contact of the touch object and a number of touch inputs by the touch object based on the number of the autonomous adjacent areas included in the touch detection area. When the touch gesture recognizing apparatus determines that there is not contact of the touch object with the touch detection area, the number of the autonomous adjacent areas included in the touch detection area may be one. Conversely, when the touch gesture recognizing apparatus determines that there is contact of the touch object with the touch detection area, the number of the autonomous adjacent areas included in the touch detection area may be at least two. For example, when the number of the autonomous adjacent areas included in the touch detection area is determined to be two, the touch gesture recognizing apparatus may determine that the touch object makes contact with the background area.

In operation 740, when the touch object is determined to be in contact with the background area, the touch gesture recognizing apparatus allocates an identifier to the touch input touched by the touch object. The touch gesture recognizing apparatus may allocate the identifier to the touch input to track a motion of the touch object. When a plurality of touch inputs are detected from the depth image based on the touch detection area, the touch gesture recognizing apparatus may allocate different identifiers to the touch inputs.

Figure 8:
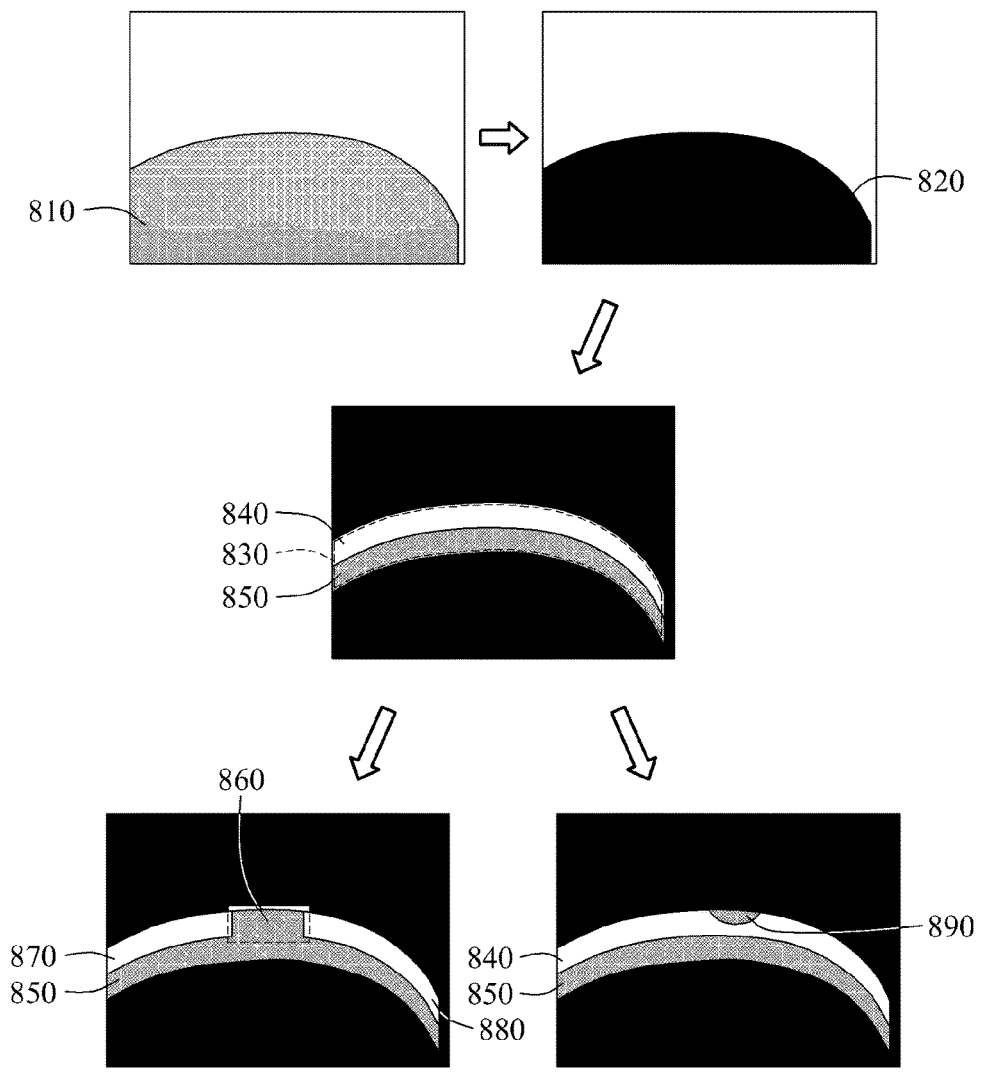
FIG. 8 is a diagram illustrating an example operation of detecting a touch input from a depth image.

FIG. 8 is a diagram illustrating an example of an operation of detecting a touch input from a depth image.

In the example of FIG. 8, the upper left box indicates a depth image obtained through a depth sensor, which includes a dorsum area of a hand of a user as a background area 810. The upper right box includes a background area 820 learned based on the background area 810. The middle box includes a touch detection area 830 determined based on the learned background area 820. A touch gesture recognizing apparatus may determine the touch detection area 830 based on a boundary of the learned background area 820. The touch detection area 830 includes a portion 850 of the learned background area 820 and an adjacent area 840 that is adjacent to the portion 850. A number of autonomous adjacent areas may be one because only the adjacent area 840 exists before a touch object makes contact.

The lower left box indicates a depth image obtained when the touch object makes contact with a background area. The adjacent area 840 included in the touch detection area 830 is divided into two autonomous adjacent areas, for example, an adjacent area 870 and an adjacent area 880, by a touch input area 860 of the touch object. When a plurality of autonomous adjacent areas is detected in the touch detection area, the touch gesture recognizing apparatus may determine that a touch input may occur by the touch object.

When the touch input is determined to occur, the touch gesture recognizing apparatus may determine information on the touch input area 860 using information on the autonomous adjacent areas 870 and 880, or obtain the information on the touch input area 860 by performing a connected component method on the touch input area 860. For example, when at least three autonomous adjacent areas are included in a touch detection area, or a plurality of areas having different depth values is present in a touch input area, the touch gesture recognizing apparatus may determine that a plurality of touch inputs is present in the touch detection area.

Figure 9:
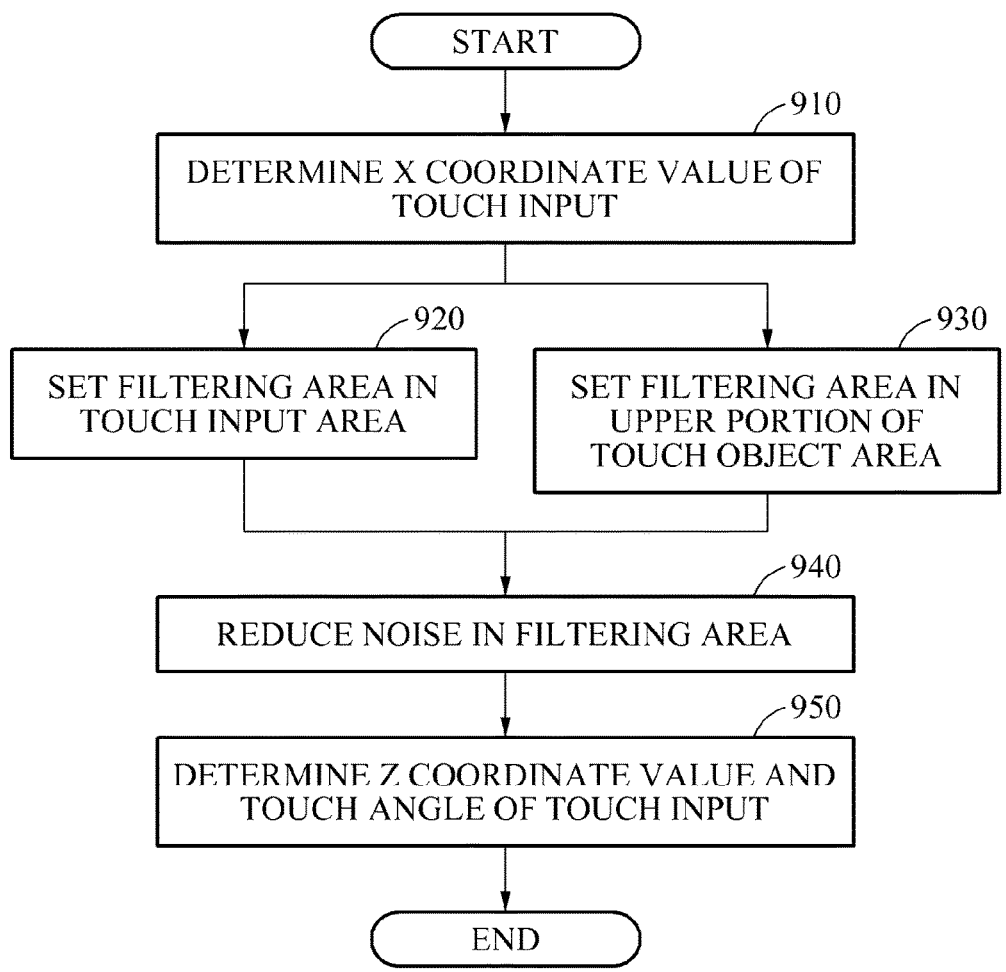
FIG. 9 is a flowchart illustrating an example method of analyzing a touch input.

FIG. 9 is a flowchart illustrating an example method of analyzing a touch input. As illustrated in FIG. 9, when a touch object is determined to be in contact with a background area, a touch gesture recognizing apparatus may determine a location and a touch angle of a touch input by analyzing the touch input.

Referring to FIG. 9, in operation 910, the touch gesture recognizing apparatus determines an x coordinate value of a touch input. The touch gesture recognizing apparatus may determine the x coordinate value of the touch input based on a touch input area included in a touch detection area in a depth image. The touch gesture recognizing apparatus may determine the x coordinate value of the touch input based on a coordinate axis in a width direction of the depth image. The touch gesture recognizing apparatus may convert a curved coordinate system of the background area to a planar coordinate system, and determine the x coordinate value of the touch input in the planar coordinate system. For example, the touch gesture recognizing apparatus may calculate the x coordinate value of the touch input based on Equation 1, as follows.

$$TP_x = \frac{B_{fmax\_x} + B_{fmin\_x}}{2} \quad \text{[Equation 1]}$$

In Equation 1, "$TP_x$" denotes an x coordinate value of a touch input on 2D coordinates.

"$B_{f\,max\_x}$" and "$B_{t\,min\_x}$" denote a maximum x coordinate value and a minimum x coordinate value, respectively, of a touch input area included in a touch detection area. Based on Equation 1, the touch gesture recognizing apparatus may determine, to be the x coordinate value of the touch input, a mean value between the maximum x coordinate value and the minimum x coordinate value of the touch input area detected in the touch detection area.

In operation 920, the touch gesture recognizing apparatus sets a filtering area in the touch input area. For example, the touch gesture recognizing apparatus may set, to be the filtering area, an N×N size area based on the x coordinate value of the touch input determined based on Equation 1. Here, "N" denotes a natural number indicating a number of pixels.

In operation 930, the touch gesture recognizing apparatus sets a filtering area in an upper portion of a touch object area. The touch gesture recognizing apparatus may set the filtering area to which a noise filter is to be applied in the upper portion of the touch object area indicating an area of the touch object. For example, the touch gesture recognizing apparatus may determine a mean value between a maximum x coordinate value and a minimum x coordinate value of the upper portion of the touch object area to be an x coordinate value of the upper portion, and set an N×N size area based on the x coordinate value of the upper portion to be the filtering area. Here, "N" denotes a number of pixels, N being a natural number.

The touch object area may be an area in which the touch object appears in the depth image and includes the touch input area. The touch input area may be a portion of the touch object area, and indicate a tip of the touch object to be in contact with the background area.

In operation 940, the touch gesture recognizing apparatus reduces noise in the filtering areas set in operations 920 and 930. A depth value of the touch input area to be output from the depth sensor may include a fluctuation element and noise. When an original depth value of the touch input area or the upper portion of the touch object area is applied, an erroneous z coordinate value may be obtained. The touch gesture recognizing apparatus may reduce depth noise included in the touch input area or the upper portion of the touch object area by applying a noise removing filter to the touch input area or the upper portion of the touch object area.

The touch gesture recognizing apparatus may apply an existing spatial noise removing filter or temporal noise removing filter to the filtering areas set in operations 920 and 930 to reduce the noise included in the filtering areas.

In operation 950, the touch gesture recognizing apparatus determines a z coordinate value and a touch angle of the touch input. The touch gestures recognizing apparatus may determine the z coordinate value of the touch input on 2D coordinates using a depth value of the touch input area to which the noise removing filter is applied.

The touch gesture recognizing apparatus may determine the touch angle of the touch input using the depth value of the upper portion of the touch object area to which the noise removing filter is applied. The touch gesture recognizing apparatus may determine the touch angle of the touch input using 2D coordinate values of the touch input area, 2D coordinate values of the upper portion of the touch object area, and a height difference between the touch input area and the upper portion of the touch object area.

The touch gesture recognizing apparatus may calculate a yaw angle and a pitch angle of the touch input using coordinates $P_d$ of the touch input area, which is transformed to be three-dimensional (3D) Cartesian coordinates, and coordinates $P_u$ of the upper portion of the touch object area, which is transformed to be 3D Cartesian coordinates.

For example, the touch gesture recognizing apparatus may calculate a 3D translation element value to calculate the touch angle of the touch input based on the following Equation 2, and calculate a 3D unit vector to calculate the touch angle based on the following Equation 3. The touch gesture recognizing apparatus may calculate the yaw angle of the touch input based on an element of the 3D unit vector as expressed in the following Equation 4, and calculate the pitch angle of the touch input based on an element of the 3D unit vector as expressed in the following Equation 5.

$$(T_x, T_y, T_z) = (x_{P_u} - x_{P_d}, y_{P_u} - y_{P_d}, z_{P_u} - z_{P_d}) \quad \text{[Equation 2]}$$

In Equation 2, "$T_x$," "$T_y$," and "$T_z$" denote 3D translation element values on x coordinates, y coordinates, and x coordinates, respectively. "$x_{pu}$," "$y_{pu}$," and "$z_{pu}$" denote locations of the upper portion of the touch object area on the x coordinates, the y coordinates, and the z coordinates, respectively. "$x_{pd}$," "$y_{pd}$," and "$z_{pd}$" denote locations of the touch input area on the x coordinates, the y coordinates, and the z coordinates, respectively.

$$(u_x, u_y, u_z) = \left( \frac{T_x}{\sqrt{T_x^2 + T_y^2 + T_z^2}}, \frac{T_y}{\sqrt{T_x^2 + T_y^2 + T_z^2}}, \frac{T_y}{\sqrt{T_x^2 + T_y^2 + T_z^2}} \right) \quad \text{[Equation 3]}$$

In Equation 3, "$u_x$," "$u_y$," and "$u_z$" denote elements of the 3D unit vector on the x coordinates, the y coordinates, and the z coordinates, respectively. "$T_x$," "$T_y$," and "$T_z$" denote 3D translation element values on three dimensions determined based on Equation 2.

$$Deg_{Yaw} = \arccos\left(-\frac{u_y}{\sqrt{1-u_z^2}}\right)$$ [Equation 4]

In Equation 4, "$Deg_{Yaw}$" denotes a yaw angle of a touch input, and "$u_y$" and "$u_z$" denote elements of the 3D unit vector on the y coordinates and the z coordinates, respectively, determined based on Equation 3.

$$Deg_{Pitch} = \arccos(u_z)$$ [Equation 5]

In Equation 5, "$Deg_{Pitch}$" denotes a pitch angle of a touch input, and "$u_z$" denotes an element of the 3D unit vector on the z coordinates determined based on Equation 3.

The touch gesture recognizing apparatus may determine the touch angle of the touch input based on the yaw angle of the touch input calculated based on Equation 4 and the pitch angle of the touch input calculated based on Equation 5.

The touch gesture recognizing apparatus may determine the touch input from the user by tracking a movement of the touch input on the 2D coordinates or tracking a change in the touch angle of the touch input.

When tracking a change in a location of the touch input, the touch gesture recognizing apparatus may use a method of alternating prediction and correction of a touch gesture in which the prediction and correction correct each other based on Bayes' rule as expressed in the following Equation 6. According to such a method, the touch gesture recognizing apparatus may improve a result of recognizing the touch gesture by repeating operations of correcting the touch gesture based on a predicted value, predicting the touch gesture based on an input value to which a weighted value is applied, and re-correcting an input value to be subsequently input based on the predicted value.

$$P(X \mid z_k) = \frac{P(z_k \mid X^-)P(X^-)}{P(z_k)}$$ [Equation 6]

In Equation 6, "X" denotes a process state, "k" denotes a step, and "$Z_k$" denotes an actual measurement value.

FIG. 10 is a diagram illustrating an example operation of analyzing a touch input.

Referring to FIG. 10, the upper left box illustrates a scene in which a finger 1020 of a user, which is a touch object, makes contact with a dorsum area (background area) 1010 of a hand of the user. A depth sensor included in a touch gesture recognizing apparatus may generate a depth image, which is illustrated as the upper right box and includes depth information on the scene illustrated in the upper left box. The depth image may include information on a depth from the depth sensor to the touch object.

The touch gesture recognizing apparatus may determine whether the touch object makes contact with a background area based on a touch detection area. When the touch object is in contact with the background area, the touch gesture recognizing apparatus may analyze a touch input area. For example, the touch gesture recognizing apparatus may determine an x coordinate value of a touch input based on Equation 1 provided above.

The touch gesture recognizing apparatus may reduce noise included in the touch input area before determining a z coordinate value of the touch input based on a depth value. As illustrated in the middle left box, the touch gesture recognizing apparatus may set a filtering area 1040 in the touch input area included in a touch detection area 1030, and may reduce noise in the filtering area 1040 by applying a noise removing filter to the filtering area 1040. Subsequently, the touch gesture recognizing apparatus may extract a depth value from the filtering area 1040, and determine the extracted depth value to be the z coordinate value of the touch input.

As illustrated in the middle right portion of FIG. 10, the touch gesture recognizing apparatus may determine a location 1050 of the touch input on 2D coordinates based on the depth value extracted from the filtering area 1040. An x coordinate value of the location 1050 of the touch input may indicate a location of the touch input based on a width direction of the depth image, and a z coordinate value of the location 1050 of the touch input may indicate a depth value of the touch input.

Referring to the lower left box of FIG. 10, the touch gesture recognizing apparatus may determine a touch angle of the touch input using a coordinate value and a depth value of an upper portion 1060 of a touch object area. As illustrated in a lower left box, using a method similar to the method applied to the touch input area, the touch gesture recognizing apparatus may set a filtering area 1070 in the upper portion 1060 of the touch object area, and reduce noise in the filtering area 1070 by applying a noise removing filter to the filtering area 1070. Subsequently, the touch gesture recognizing apparatus may extract a depth value from the filtering area 1070, and determine the touch angle of the touch input based on the depth value extracted from the filtering area 1070.

Figure 11:
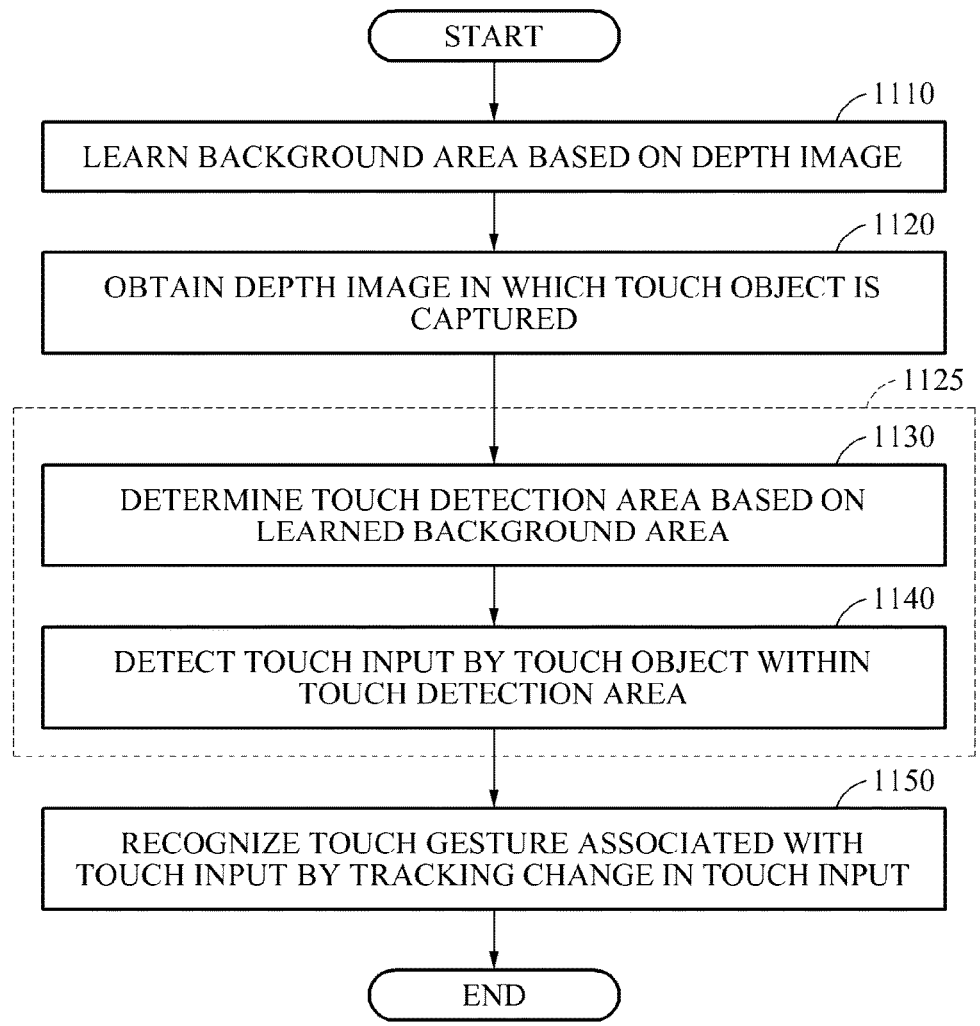
FIG. 11 is a flowchart illustrating another example method of recognizing a touch gesture.

FIG. 11 is a flowchart illustrating another example method of recognizing a touch gesture. The method of recognizing a touch gesture may be performed by a touch gesture recognizing apparatus.

Referring to FIG. 11, in operation 1110, the touch gesture recognizing apparatus learns a background area based on a depth image. The touch gesture recognizing apparatus may learn the depth image for the background area in a state in which a touch object does not exist in order to distinguish between the background area in the depth image and a touch object area in which the touch object appears in the depth image.

The touch gesture recognizing apparatus may determine a background area to be used for a touch input by learning a background area included in an initial depth image, which is obtained in an initial state of an operation. The touch gesture recognizing apparatus may determine whether the background area included in the initial depth image satisfies a predetermined learning condition. When the background area satisfies the learning condition, the touch gesture recognizing apparatus may learn the background area based on the initial depth image. The touch gesture recognizing apparatus may extract the background area from the initial depth image, and learn the background area to be in contact on the touch object based on the extracted background area.

Subsequent to the initial state of the operation, the touch gesture recognizing apparatus may continuously learn a background area included in a depth image. Every time a predetermined learning cycle arrives, the touch gesture recognizing apparatus may learn a background area from a learning depth image used for learning a background area, and update the background area to be in contact on the touch object based on a result of the learning. The touch gesture recognizing apparatus may determine a touch detection area from the learned background area.

In operation 1120, the touch gesture recognizing apparatus obtains the depth image in which the touch object and the background area are captured. The obtained depth image may include the touch object area including depth information of the touch object.

In operation 1125, the touch gesture recognizing apparatus detects a touch input produced by the touch object in contact with the background area from the depth image, as set forth in detailed operations 1130 and 1140. The detecting of the touch input is performed in a touch detection area based on the learned background area. In detailed operation 1130, the touch gesture recognizing apparatus determines the touch detection area based on the background area learned in operation 1110. The touch detection area may include a portion of the learned background area and an adjacent area that is adjacent to a boundary of the learned background area. For example, the background area may correspond to an entire area or a portion of a dorsum or a palm of a hand, or an arm area of the user.

In detailed operation 1140, the touch gesture recognizing apparatus detects the touch input applied by the touch object to the background area in the touch detection area. The touch gesture recognizing apparatus may determine whether the touch object makes contact with a boundary of the learned background area on the touch detection area. The touch gesture recognizing apparatus may determine whether the touch object makes contact with a boundary of the learned background area on the touch detection area based on a shape of the background area included in the touch detection area. The touch gesture recognizing apparatus may detect at least one touch input within the touch detection area.

The touch gesture recognizing apparatus may detect a change in the touch input while the touch object is in contact with the touch detection area. The touch gesture recognizing apparatus may determine a location or a touch angle of the touch input. The touch gesture recognizing apparatus may determine an x coordinate value of the touch input based on the touch object area in the depth image. The touch gesture recognizing apparatus may reduce noise by applying a noise removing filter to a filtering area determined based on the determined x coordinate value, and determine a z coordinate value of the touch input. The touch gesture recognizing apparatus may determine the touch angle of the touch input based on an x coordinate value and a z coordinate value of an upper portion of the touch object area.

In operation 1150, the touch gesture recognizing apparatus recognizes a touch gesture associated with the touch input by tracking a change in the touch input. The touch gesture recognizing apparatus may recognize the touch gesture associated with the touch input by tracking a change in the location or the touch angle of the touch input. The touch gesture recognizing apparatus may determine a gesture pattern intended by the user through the touch object by parsing the change in the location or the touch angle of the touch input over time, and may generate information on the determined gesture pattern. When a plurality of touch inputs is detected, the touch gesture recognizing apparatus may recognize a touch gesture associated with the touch inputs based on a mutual relation among the touch inputs.

Figure 12:
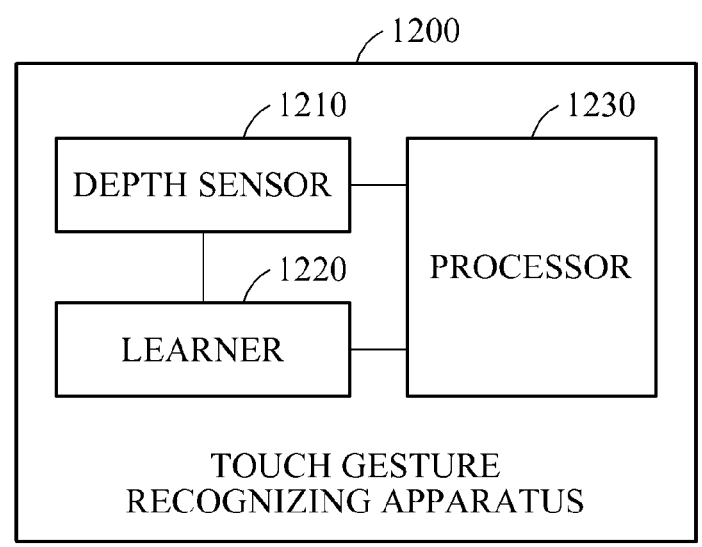
FIG. 12 is a diagram illustrating an example configuration of an apparatus for recognizing a touch gesture.

FIG. 12 is a diagram illustrating an example configuration of a touch gesture recognizing apparatus 1200. Referring to FIG. 12, the touch gesture recognizing apparatus 1200 includes a depth sensor 1210, a learner 1220, and a processor 1230.

The touch gesture recognizing apparatus 1200 determines whether at least one touch object such as a finger makes contact with a background area such as a dorsum area of a hand of a user using the depth sensor 1210 such as a 3D depth camera. For example, when a plurality of touch objects makes contact with the background area, the touch gesture recognizing apparatus 1200 may track a motion of each touch object, and recognize a gesture pattern corresponding to a touch input based on a mutual relation among motions of the touch objects.

The touch gesture recognizing apparatus 1200 may generate a control signal corresponding to the motion of the touch object by recognizing the motion of the touch object inputting the gesture pattern while the touch object is in contact with the background area. For example, another device interworking with the touch gesture recognizing apparatus 1200 may receive the control signal from the touch gesture recognizing apparatus 1200 and display a gesture pattern corresponding to an input from the user.

The touch gesture recognizing apparatus 1200 may recognize the gesture pattern associated with the touch input by automatically detecting the touch object in contact with the background area. The touch gesture recognizing apparatus 1200 may recognize a more accurate gesture pattern by obtaining location information of an area of the touch input through a depth image obtained by the depth sensor 1210.

The depth sensor 1210 may obtain the depth image. The depth sensor 1210 may include an optical source (not shown) emitting light to an area, and an image sensor (not shown) receiving light reflected from the light emitted from the optical source. For example, the optical source may emit invisible light such as infrared light and ultraviolet light, or visible light. The image sensor may include a pixel array configured to obtain distribution of the reflected light. The depth sensor 1210 may generate the depth image including information on a distance between the optical source included in the depth sensor 1210 and the touch object, and an adjacent area using a time of flight (ToF) method.

The learner 1220 may learn a background area based on a learning depth image obtained by the depth sensor 1210. For example, the learner 1220 may learn, from the depth image, a background area corresponding to a dorsum or a palm of a hand or an arm area of the user to which the touch input applied by the touch object is to be input. The learner 1220 may learn the depth image for the background area in a state in which the touch object does not exist in the depth image in order to distinguish the background area in the depth image from a touch object area in which the touch object appears in the depth image.

The learner 1220 may determine a background area to be used for the touch input by learning a background area included in an initial depth image obtained at an initial state of an operation. The learner 1220 may extract the background area from the initial depth image, and learn the background area to be in contact on the touch object based on the extracted background area.

Subsequent to the initial state of the operation, the learner 1220 may continuously learn a background area included in the depth image. At each instance at which a predetermined learning cycle arrives, the learner 1220 may learn the background area from the learning depth image used for learning a background area, and update the background area to be in contact on the touch object based on a result of the learning. The learner 1220 may determine whether a touch event is present on the touch detection area based on learning a background area. When the touch event is absent from the learning depth image, the learner 1220 may extract an adjacent area that is adjacent to a boundary of the background area from the learning depth image, and learn a new touch detection area based on the extracted adjacent area.

The processor 1230 may determine a touch detection area based on the learned background area, and detect a touch input applied by the touch object within the touch detection area. The processor 1230 may determine whether the touch object makes contact on the touch detection area, and track changes in the touch input while the touch object is in contact on the touch detection area. The processor 1230 may recognize a touch gesture associated with the touch input by tracking a motion of the touch input. The processor 1230 may recognize the touch gesture corresponding to the motion of the touch input by tracking changes in a location or a touch angle of the touch input.

The processor 1230 may determine a gesture pattern intended by the user through the touch object by parsing the changes in the location and the touch angle of the touch input indicated in the depth image over time. The processor 1230 may then generate information on the determined gesture pattern. The processor 1230 may determine a motion pattern intended by the user using a learning-based method or an existing gesture recognizing method.

Figure 13A:
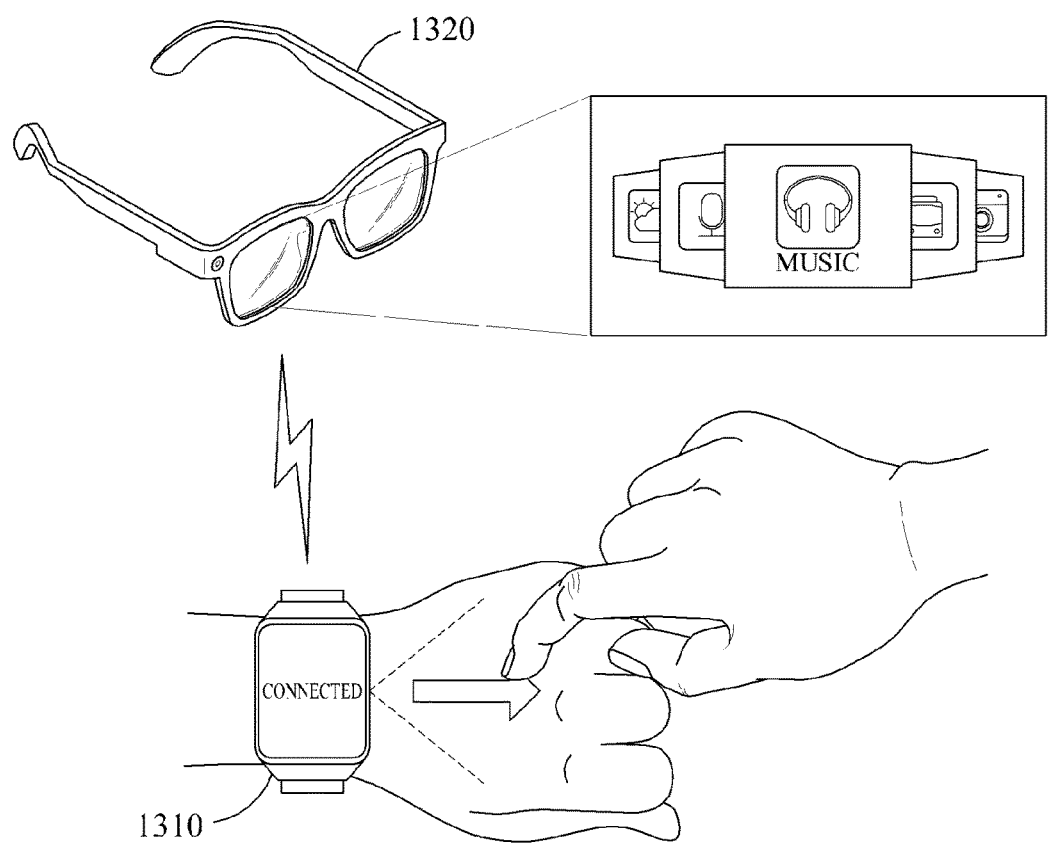
FIGS. 13A and 13B illustrate other examples of implementation of an apparatus for recognizing a touch gesture.
Figure 13B:
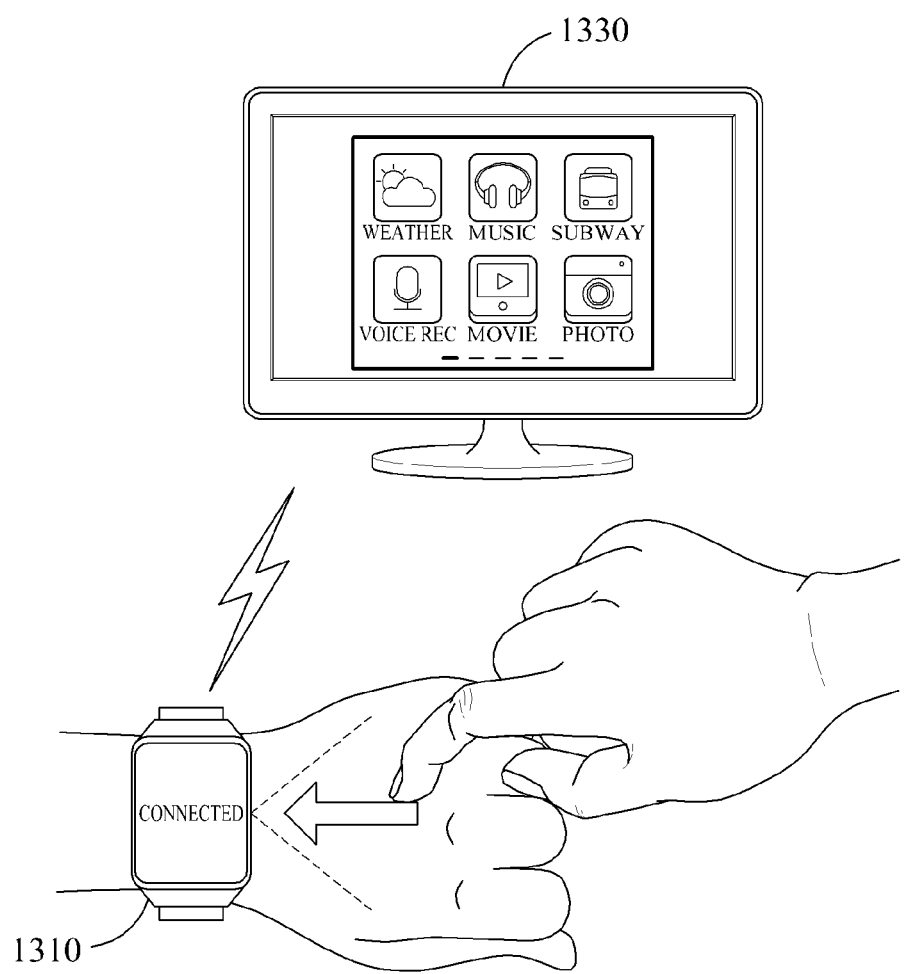

FIGS. 13A and 13B illustrate other example implementations of a touch gesture recognizing apparatus.

Referring to FIGS. 13A and 13B, a touch gesture recognizing apparatus 1310 performs an interface controlling operation by interworking with an external device. For example, the touch gesture recognizing apparatus 1310 may operate through interworking with a glass type wearable device as illustrated in FIG. 13A or with a display device illustrated in FIG. 13B. In the example of FIG. 13A, a pair of smart glasses 1320 is illustrated as an example of the glass type wearable device. In the example of FIG. 13B, a smart television (TV) 1330 is illustrated as an example of the display device.

For example, when a user wears a watch type wearable device including the touch gesture recognizing apparatus 1310 and inputs a user input to a dorsum of a hand of the user using a finger or a pen, the touch gesture recognizing apparatus 1310 may recognize the user input made to the dorsum and identify a gesture pattern corresponding to the recognized user input. The touch gesture recognizing apparatus 1310 may transmit a control signal corresponding to the identified gesture pattern to an external device such as the smart glasses 1320 and the smart TV 1330. The external device receiving the control signal from the touch gesture recognizing apparatus 1310 may perform an interface operation corresponding to the received control signal.

For example, when the user input is dragging in a certain direction on the dorsum, the touch gesture recognizing apparatus 1310 may generate a control signal corresponding to the dragging and transmit the control signal to the external device. The external device receiving the control signal may, for example, perform an interface operation of moving a content array displayed on the external device to a side or an interface operation of selecting a next content from a current content displayed on the external device.

The apparatuses, units, modules, devices, and other components illustrated in FIGS. 1A-1C, 12, 13A and 13B that perform the operations described herein with respect to FIGS. 2, 3, 5, 7, 9 and 11 are implemented by hardware components. Examples of hardware components include controllers, sensors, generators, drivers, displays and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2, 3, 5, 7, 9 and 11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3, 5, 7, 9 and 11 that perform the operations described herein with respect to FIGS. 1A-1C, 12, 13A and 13B are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD- RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a wearable device described herein may include a ring, a watch, a pair of glasses, a bracelet, an ankle bracelet, a belt, a necklace, an earring, a headband, a helmet, or a device embedded in clothing, a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, a high-definition television (HDTV), a DVD player, a Blu-ray player, or any other device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of recognizing a touch gesture to be performed by an apparatus for recognizing a touch gesture, the method comprising:
    obtaining, by a processor included in the apparatus, a depth image in which a touch object and a background area are captured;
    detecting, by the processor, from the depth image, a touch input applied by the touch object to the background area in a touch detection area; and
    recognizing, by the processor, a touch gesture associated with the touch input by tracking a change in the touch input,
    wherein the background area is learned based on whether a touch event is present in a touch detection area of a learning depth image,
    wherein the touch event is determined to be present in the touch detection area of the learning depth image when a curvature of a background area satisfies a predetermined learning condition based on a change of the curvature, and
    wherein the curvature of the background area is determined to satisfy the predetermined learning condition when the change of the curvature is more than a curvature threshold.

2. The method of claim 1, further comprising:
    learning, by the processor, the background area; and
    determining, by the processor, the touch detection area from the learned background area,
    wherein the detecting of the touch input is performed in the touch detection area based on the learned background area.

3. The method of claim 2, wherein the learning of the background area comprises:
    determining, by the processor, whether an initial background area on an initial depth image satisfies a predetermined learning condition; and
    learning, by the processor, the background area based on the initial depth image, in response to the background area satisfying the predetermined learning condition.

4. The method of claim 2, comprising:
    determining, by the processor, whether a predetermined learning cycle arrives;
    obtaining, by the processor, the learning depth image when the predetermined learning cycle arrives;
    determining, by the processor, when the predetermined learning cycle arrives, whether the touch event is present in the touch detection area of the learning depth image based on learning a background area for learning included in the learning depth image;
    extracting, by the processor, an adjacent area that is adjacent to a boundary of the background area for learning from the learning depth image, in response to the touch event being absent in the touch detection area; and
    learning, by the processor, a new touch detection area based on the extracted adjacent area.

5. The method of claim 2, wherein the detecting of the touch input comprises:
    determining, by the processor, a touch detection area to detect the touch input based on the learned background area; and
    detecting, by the processor, the touch input within the touch detection area.

6. The method of claim 5, wherein the touch detection area comprises a portion of the learned background area and an adjacent area that is adjacent to a boundary of the learned background area.

7. The method of claim 5, wherein the detecting of the touch input comprises:
    determining, by the processor, whether the touch object makes contact on the touch detection area; and
    detecting, by the processor, a change in the touch input, in response to the touch object being in contact on the touch detection area.

8. The method of claim 7, wherein the determining of whether the touch object makes contact on the touch detection area comprises:
    determining, by the processor, whether the touch object makes contact with a boundary of the learned background area on the touch detection area based on a shape of the learned background area.

9. The method of claim 5, wherein:
the detecting of the touch input comprises detecting, by the processor, touch inputs within the touch detection area, and
the recognizing of the touch gesture comprises recognizing, by the processor, a touch gesture associated with the touch inputs based on a mutual relation between the detected touch inputs.

10. The method of claim 1, wherein:
the detecting of the touch input comprises determining, by the processor, at least one of a location of the touch input and a touch angle of the touch input; and
the tracking of the change in the touch input comprises tracking, by the processor, at least one of a change in the location of the touch input and a change in the touch angle of the touch input.

11. A non-transitory computer-readable storage medium storing instructions that, when executed by a processor, cause the processor to perform the method of claim 1.

12. A method of recognizing a touch gesture to be performed by an apparatus for recognizing a touch gesture, the method comprising:
learning, by a processor, based on whether a touch event is present in a touch detection area of a learning depth image, the background area to be in contact with a touch object;
determining, by the processor, the touch detection area based on the learned background area;
detecting, by the processor, a touch input by the touch object based on a touch object area in the touch detection area; and
recognizing, by the processor, a touch gesture corresponding to a motion of the touch input,
wherein the touch event is determined to be present in the touch detection area of the learning depth image when a curvature of a background area satisfies a predetermined learning condition based on a change of the curvature, and
wherein the curvature of the background area is determined to satisfy the predetermined learning condition when the change of the curvature is more than a curvature threshold.

13. The method of claim 12, wherein the learning of the background area to be in contact with the touch object comprises:
determining, by the processor, whether a predetermined learning cycle arrives;
determining, by the processor, when the predetermined learning cycle arrives, whether the touch event is present in the learning depth image;
extracting, by the processor, a background area for learning from the learning depth image, in response to the touch event being absent in the learning depth image; and
learning, by the processor, the background area to be in contact with the touch object based on the extracted background area.

14. The method of claim 12, wherein the detecting of the touch input comprises:
determining, by the processor, whether the touch object makes contact within the touch detection area; and
detecting, by the processor, a change in the touch input, in response to the touch object being in contact with the touch detection area.

15. The method of claim 12, wherein:
the detecting of the touch input comprises determining, by the processor, at least one of a location of the touch input and a touch angle of the touch input; and
the recognizing of the touch gesture comprises recognizing, by the processor, a touch gesture associated with the touch input by tracking at least one of a change in the location of the touch input and a change in the touch angle of the touch input.

16. An apparatus for recognizing a touch gesture, comprising:
a depth sensor configured to obtain a depth image in which a touch object is captured; and
a processor configured to detect, from the depth image, a touch input applied by the touch object in a background area and recognize a touch gesture associated with the touch input by tracking a change in the touch input,
wherein the background area is learned based on whether a touch event is present in a touch detection area of a learning depth image,
wherein the touch event is determined to be present in the touch detection area of the learning depth image when a curvature of a background area satisfies a predetermined learning condition based on a change of the curvature, and
wherein the curvature of the background area is determined to satisfy the predetermined learning condition when the change of the curvature is more than a curvature threshold.

17. The apparatus of claim 16, wherein the processor is further configured to:
learn a background area for an adjacent area that is adjacent to a boundary of the background area detected in the depth image; and
update the touch detection area based on updating the learned background area at predetermined learning cycles.

18. The apparatus of claim 17, wherein the processor is further configured to determine whether the touch event is present in the touch detection area when a predetermined learning cycle arrives, and to extract a learning background area from the learning depth image and learn the background area from the learning depth image, in response to the touch event being absent in the touch detection area.

19. The apparatus of claim 17, wherein the processor is configured to determine the touch detection area for detecting the touch input based on the learned background area, and detect a change in the touch input within the touch detection area.

20. The apparatus of claim 16, wherein the apparatus is included in a wearable device.

* * * * *